No. 777,911. PATENTED DEC. 20, 1904.
J. B. MORRISON.
TURPENTINE CUP.
APPLICATION FILED JUNE 27, 1904.
NO MODEL.
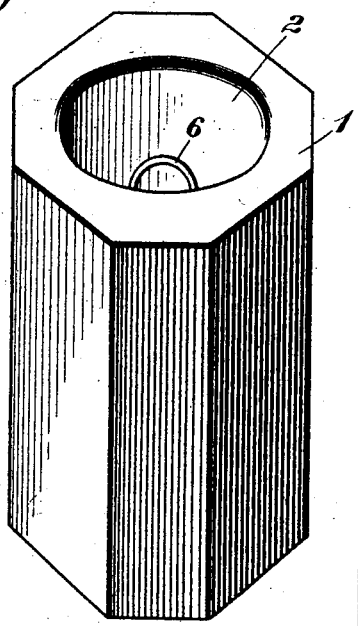
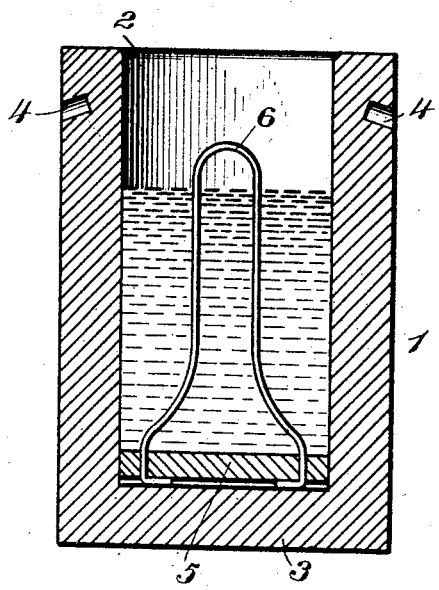
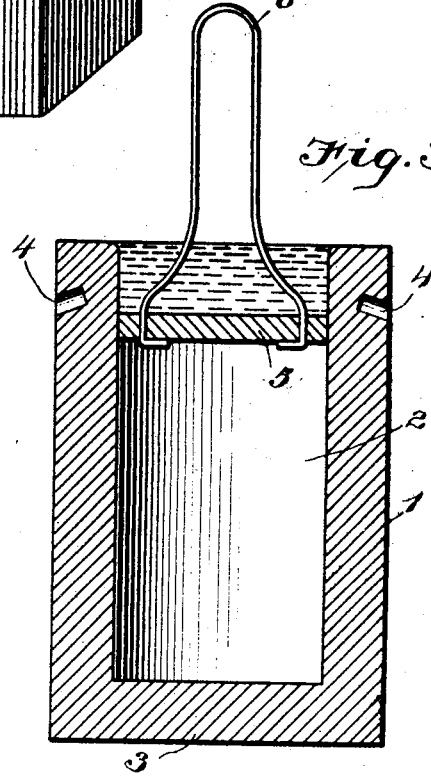

No. 777,911. Patented December 20, 1904.

UNITED STATES PATENT OFFICE.

JAMES B. MORRISON, OF MONKS CORNER, SOUTH CAROLINA.

TURPENTINE-CUP.

SPECIFICATION forming part of Letters Patent No. 777,911, dated December 20, 1904.

Application filed June 27, 1904. Serial No. 214,354.

*To all whom it may concern:*

Be it known that I, JAMES B. MORRISON, a citizen of the United States, residing at Monks Corner, in the county of Berkeley and State of South Carolina, have invented certain new and useful Improvements in Turpentine-Cups; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a cup for collecting turpentine-gum from trees, and has for its object to provide a device of this class which is particularly simple in its construction and which provides for a quick and ready emptying of the gum from the cup.

With this object in view my invention consists in the construction of the cup and in the arrangement of the parts.

Referring to the accompanying drawings, Figure 1 is a perspective view of the device. Fig. 2 is a vertical sectional view taken through the cup and showing the movable bottom in its lowest position, and Fig. 3 is a like view showing the movable bottom in a raised position.

Like numerals of reference indicate the same parts throughout the several figures, in which—

1 indicates the cup, which may be constructed of any suitable size or material, but preferably of wood. The said cup 1 is, as shown, provided with a cylindrical bore 2 and a bottom 3, while the sides of the cup are provided with two small openings 4, within which a suitable bail or fastening means is secured to conveniently hold the cup in position for receiving the gum.

5 indicates the removable bottom, which, as shown in Figs. 2 and 3, is provided with a loop 6, secured to said bottom by passing the ends of said loop through the bottom and bending the ends under the bottom, as shown. The bottom 3 is substantially a disk and is of a size sufficient to allow the same to move freely within the cup without bending.

Having thus described the several parts of my invention, its operation is as follows: The cup is placed in a convenient position to receive the gum from the tree, and when the same is sufficiently full—as is, for instance, shown in Fig. 2—the loop 6 is engaged by a hook or other suitable instrument and raised. The gum in the cup being supported by the movable bottom 5 is drawn out of the cup when the said bottom is raised, as shown in Fig. 3, and by this means the entire contents of the cup is emptied into a suitable receptacle for conveying the gum.

It is obvious that as the movable bottom 5 is withdrawn from the cup the said bottom in passing up through the cup effectually cuts the gum from the edges of the cup and instantly removes all the contents therefrom. When the gum has been removed from the cup, the removable bottom 5 is dropped back into normal position, and the cup is replaced to again receive the gum from the tree.

Having thus set forth my invention, I do not wish to be understood as limiting myself to the exact construction as herein set forth, as various slight changes may be made therein which would fall within the limit and scope of my invention, and I consider myself clearly entitled to all such changes and modifications.

What I claim as my invention, and desire to secure by Letters Patent of the United States, is—

In a cup for receiving turpentine-gum from trees, the combination of a cup, a removable bottom adapted to be inserted within said cup, said removable bottom being continuous or solid so as to prevent any of the contents of the cup from passing therethrough, a loop connected to said bottom, said bottom acting to cut the gum from the sides of the cup when said bottom is raised, substantially as described and for the purposes set forth.

In testimony whereof I affix my signature in presence of two witnesses.

JAMES B. MORRISON.

Witnesses:
C. M. HIGGINS,
T. W. WILLIAMS.